United States Patent [19]

Weidner et al.

[11] Patent Number: 5,047,492

[45] Date of Patent: Sep. 10, 1991

[54] ORGANOOLIGOSILSESQUIOXANES

[75] Inventors: Richard Weidner; Norbert Zeller; Bernward Deubzer; Volker Frey, all of Burghausen, Fed. Rep. of Germany

[73] Assignee: Wacker-Chemie GmbH, Munich, Fed. Rep. of Germany

[21] Appl. No.: 416,073

[22] Filed: Oct. 2, 1989

[30] Foreign Application Priority Data

Nov. 3, 1988 [DE] Fed. Rep. of Germany ....... 3837397

[51] Int. Cl.$^5$ .............................................. C08G 77/06
[52] U.S. Cl. ....................................... 528/15; 528/33; 528/31; 528/32; 528/34; 528/25
[58] Field of Search .................. 528/15, 33, 31, 32, 528/34, 25

[56] References Cited

U.S. PATENT DOCUMENTS 4,289,867  9/1981  Martin .................................. 528/34

Primary Examiner—Kriellion S. Morgan
Assistant Examiner—Karen A. Hellender

[57] ABSTRACT

The invention relates to compounds of the formula $$[RSiO_{3/2}]_z \quad (I)$$

in which
z is 6, 8 or 10;
R represents the same or different radicals of the formulas $-CH_2CH_2-X$ (II), $-CH(CH_3)-X$ (III) or
$-O-Si(R'_2)-Y$ (IV)

with the proviso that up to z-1 of the radicals can also be radicals of the formula $-O-SiR'_3$, in which X represents a monovalent radical or one half of a divalent radical of the formulas $-(R'_2SiO)_nR'$, (V)

$[-(R'_2SiO)_n-]_{\frac{1}{2}}$, (VI)

$-S-R''$, (VII)

$[-S-R'''-S-]_{\frac{1}{2}}$ or (XV)

$-CH_2-Z$, (VIII)

R' represents the same or different $C_1$- to $C_6$-alkyl, $C_1$- to $C_6$-alkoxy or phenyl radicals;
R'' represents the same or different $C_1$- to $C_{18}$-alkyl radicals, which can be substituted by radicals of formulas (V) or (VI);
R''' represents the same or different divalent $C_1$- to $C_{18}$-hydrocarbon radicals, preferably alkylene and/or phenylene radicals and/or radicals of the formula $-(R'_2SiO)_n-$;

Z represents a halogen atom or an N-bonded amino radical, that is an $NH_2$ radical, an N-piperidinyl, n-piperazinyl or N-morpholinyl radical or a $C_1$- to $C_6$-N-monoalkylamino or a $C_1$- to $C_6$-dialkylamino radical;
Y represents a hydrogen atom, an optionally halogenated $C_2$- to $C_{10}$-hydrocarbon radical or a radical of the formulas (II) or (III); and
n represents an integer having a value of at least 1.

12 Claims, No Drawings

ORGANOOLIGOSILSESQUIOXANES

The invention relates to novel organooligosilsesquioxanes and processes for their preparation.

BACKGROUND OF THE INVENTION

Organooligosilsesquioxanes have been described, for example, in the papers by M. G. Voronkov et al (Zhur. Obshchei Khimii 49 (7), page 1522 (1979); Dokl. Akad. Nauk. SSSR 281(6), page 1374 (1985); and ibid. 270(4), page 888 (1983)).

It is an object of the present invention to provide novel organooligosilsesquioxanes. Another object of the present invention is to develop processes for the preparation of organooligosilsesquioxanes. Still another object of the present invention is to modify organooligosilsesquioxanes by chemical reactions. A further object of the present invention is to provide novel crosslinking agents for silicones and organic polymers.

SUMMARY OF THE INVENTION

The foregoing objects and others which will become apparent from the following description are accomplished in accordance with this invention, generally speaking, by providing organooligosilsesquioxanes of the formula $$[RSiO_{3/2}]_z \quad \text{(I)}$$

in which z is the number 6, 8 or 10; and R represents the same or different radicals of the formulas $-CH_2CH_2-X$ (II), $-CH(CH_3)-X$ (III) or $-O-Si(R'_2)-Y$ (IV) with the proviso that up to $z-1$ of the R radicals can also be radicals of the formula $-O-SiR'_3$, in which X represents a monovalent radical or one-half of a divalent radical of the formulas $-(R'_2SiO)_nR'$ (V), $[-(R'_2SiO)_n]\frac{1}{2}$ (VI), $-S-R''$ (VII), $[-S-R'''-S-]\frac{1}{2}$ (XV) or $-CH_2-Z$ (VIII); R' represents the same or different $C_1$- to $C_6$-alkyl, $C_1$- to $C_6$-alkoxy or phenyl radicals; R'' represents the same or different $C_1$- to $C_{18}$-alkyl radicals, which can be substituted by radicals of formulas (V) or (VI);

R''' represents the same or different divalent $C_1$- to $C_{18}$-hydrocarbon radicals, preferably alkylene and/or phenylene

Z represents a halogen atom or an N-bonded amino radical, that is, an $-NH_2$ radical, an N-piperidinyl, N-piperazinyl or N-morpholinyl radical or a $C_1$- to $C_6$-N-monoalkylamino or a $C_1$- or $C_6$-dialkylamino radical;

Y represents a hydrogen atom, an optionally halogenated $C_2$- to $C_{10}$-hydrocarbon radical or a radical of formulas (II) or (III); and n represents an integer having a value of at least 1.

DESCRIPTION OF THE INVENTION

The radicals represented by R' are $C_1$- to $C_6$-alkyl radicals, such as, for example, the methyl, ethyl, n-propyl, i-propyl, n-butyl, sec-butyl and t-butyl radicals, pentyl radicals, such as the n-pentyl, sec-pentyl, neopentyl and t-pentyl radicals, and hexyl radicals, sch as the n-hexyl radical; $C_1$- to $C_6$-alkoxy radicals, such as methoxy, ethoxy, n- and i-propoxy, n-, sec- and t-butoxy radicals, n-, sec-, t- and neo-pentoxy radicals and hexoxy radicals, such as the n-hexoxy radical; and phenyl radicals.

Preferred R' radicals are methyl, methoxy and ethoxy radicals.

Examples of R'' radicals are the radicals mentioned as examples of the R' alkyl radicals, and heptyl radicals, such as the n-heptyl radical, octyl radicals, such as the n- and the i-octyl radicals, and nonyl, decyl, dodecyl and octadecyl radicals. These radicals can be substituted, in particular, by radicals of formulas (V) and (VI), the radicals R' of which are methyl, methoxy and ethoxy radicals. Preferably, R' represents the same or different methyl or methoxy or ethoxy groups;

R'' represents the same or different $C_1$- to $C_{14}$-alkyl radicals which can optionally be substituted by one radical of formulas (V) or (VI);

Z represents a chlorine or bromine atom or an N-piperidinyl radical; and

Y represents a hydrogen atom, a vinyl, allyl, 3-chloropropyl or 3-bromopropyl group or a radical of formulas (II) or (III).

Examples of preferred R radicals are radicals of the following formulas:

$-CH_2-CH_2-Si(CH_3)_2-O-Si(CH_3)_3$, $-CH_2-CH_2-Si(CH_3)_2O\ C_2H_5$,
$-CH_2-CH_2-[Si(CH_3)_2O\ ]_n-Si(CH_3)_2-CH_2-CH_2-$, $-CH_2-CH_2-S-n-C_{12}H_{25}$,
$-CH-CH_2-S-CH_2-CH_2-CH_2-Si(CH_3)(OCH_3)_2$, $-CH_2-CH_2-CH_2-Cl$,

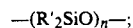

$-O-Si(CH_3)_2CH=CH_2$, $-O-Si(CH_3)_2H$, $-O-Si(CH_3)_2-(n-C_3H_6)-Cl$,
$-O-Si(CH_3)_2-(n-C_2H_4)-Si(CH_3)_2-O-Si(CH_3)_3$,
$-O-Si(CH_3)_2-(n-C_2H_4)-S-n-C_{12}H_{25}$,
$-O-Si(CH_3)_2-(n-C_2H_4)-S-(n-C_3H_7)-Si(CH_3)(OCH_3)_2$,
$-O-Si(CH_3)_2-C_2H_4-[Si(CH_3)_2-O-]_n-Si(CH_3)_2-Chd\ 2H_4-Si(CH_3)_2-O-$, in which subscript "n" is as defined above.

The compounds of formula (I) may be prepared by several processes.

Process 1

Thus, compounds of formula (I) in which R is at least in part a radical of formulas (II), (III) or (IV), in which X represents a radical of formulas (V), (VI), (VII) or (XV) and Y represents a radical of formulas (II) or (III), can be prepared by reacting compounds of the formula $$[E-(R'_2SiO)_ySiO_{3/2}]_x[RSiO_{3/2}]_{(8-x)} \quad \text{(IX)}$$

in which x is an integer having a value of from 1 to 8 and y is an integer having a value of at least 0, preferably having a value of not more than 1, with compounds of the formula $$GX \quad \text{(X)}$$

in which the radicals E of formula (IX) differ from the radicals G in formula (X) and the radicals E and G represent either vinyl groups or hydrogen atoms which are bonded directly to silicon atoms or sulfur atoms.

If in the above process (1), X represents a radical of formulas (V) or (VI) [process variant (A), identified as "process (1A)"], the reaction is preferably carried out in the presence of platinum metals and/or compounds thereof.

If in the above process (1), X represents a radical of formulas (VII) or (XV) [process variant (B), identified as "process (1B)"], the reaction is preferably carried out in the presence of free radicals, in particular in the presence of organic peroxides, azo compounds and/or under irradiation with high-energy electromagnetic radiation, such as UV light.

Compounds of formula (IX) for which y has the value 0 are preferred as the starting material for process (1) according to the invention. Octavinyloctasilsesquioxane, which is prepared by the process of M. G. Voronkov et al (Zhur. Obshchei Khimii 49 (7), page 1522 (1979)), is particularly preferred.

Process 1A

Preferred platinum metals and/or compounds thereof are the metals platinum, palladium, rhodium and iridium, alloys and chemical compounds thereof and mixtures thereof. Platinum and compounds and alloys thereof, which may be applied to supports, are particularly preferred. All the catalysts which have been, or could have been employed heretofore for addition of hydrogen atoms bonded directly to Si atoms onto aliphatically unsaturated compounds can be employed here. Examples of such catalysts are metallic and finely divided platinum, which can be on supports, such as silicon dioxide, aluminum oxide or active charcoal, compounds or complexes of platinum, such as platinum halides, for example $PtCl_4$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, in particular platinum-divinyltetramethyldisiloxane complexes with or without a detectable amount of inorganically bonded halogen, bis-(gamma-picoline)-platinum dichloride, trimethylenedipyridineplatinum dichloride, dicyclopentadiene-platinum dichloride, dimethylsulfoxideethyleneplatinum(II)dichloride and reaction products of platinum tetrachloride with olefin and primary amine or secondary amine or primary and secondary amine, such as the reaction product of platinum tetrachloride, dissolved in 1-octene, with sec-butylamine, or ammonium-platinum complexes according to EP-B 110,370.

The platinum catalyst is preferably employed in amounts of from 0.5 to 500 ppm by weight (parts by weight per million parts by weight), in particular 2 to 400 ppm by weight, calculated as elemental platinum and based on the weight of compounds of formula (IX).

Process (1A) is preferably carried out at temperatures of from 20° C. to 120° C., in particular 30° C. to 100° C. The process can be carried out under the pressure of the surrounding atmosphere, that is to say, for example, 0.1 MPa (absolute), and it can also be carried out under higher or lower pressures. Pressures of from 0.02 to 0.2 MPa (absolute), in particular 0.08 to 0.15 MPa (absolute) are preferred.

The fact that process (1A) described above prepared the compounds of this invention is surprising. M. G. Voronkov et al (Doklady Akademii Nauk SSSR, volume 270, No. 4, pages 888–890 (1983); published in the English language by Plenum Publishing Corporation, page 185–186 (1983)) reported that it is impossible to hydrosilylate the vinyl groups of octavinyloctasilsesquioxane.

Process 1B

Peroxides, in particular organic peroxides, are the preferred source of free radicals which are preferably employed in variant (B) of the process according to this invention. Examples of such organic peroxides are peroxyketals, for example 1,1-bis(tert-butylperoxy)-3,3,5-trimethylcyclohexane, 2,2-bis(tert-butylperoxy)-butane and similar compounds, diacyl peroxides, such as, for example, acetyl peroxide, isobutyl peroxide, benzoyl peroxide and similar compounds, dialkyl peroxides, such as, for example, di-tert-butyl peroxide, tert-butyl cumyl peroxide, dicumyl peroxide, 2,5-dimethyl-2,5-di(tert-butylperoxy)hexane and similar compounds, and peresters, such as, for example, tertbutylperoxyisopropyl carbonate and tert-butyl perbenzoate, as well as azo compounds, such as $\alpha,\alpha'$-azobisisobutyronitrile.

Peroxides and azo compounds are preferably used in the process of this invention in amounts of from 0.2 percent by weight to 2 percent by weight, in particular 0.5 percent by weight to 1.3 percent by weight, based on the weight of the compound of formula (IX) employed.

Process (1B) is preferably carried but at temperatures of from 0° C. to 200° C., in particular 20° C. to 150° C. The process can be carried out under the pressure of the surrounding atmosphere, that is to say, for example, 0.1 MPa (absolute), and it can also be carried out under higher or lower pressures. Pressures of from 0.02 to 0.2 MPa (absolute), in particular 0.08 to 0.15 MPa (absolute), are preferred.

Process (1) with its variants (A) and (B) can be carried out in the presence or in the absence of solvents. If solvents are used, solvents or solvent mixtures having a boiling point or boiling range of up to 120° C. under 0.1 MPa are preferred. Examples of such solvents are water; alcohols, such as methanol, ethanol, n-propanol and isopropanol; ethers, such as dioxane, tetrahydrofuran, diethyl ether and diethylene glycol dimethyl ether; chlorinated hydrocarbons, such as methylene chloride, chloroform, carbon tetrachloride, 1,2-dichloroethane and trichloroethylene; hydrocarbons, such as pentane, n-hexane, hexane isomer mixtures, heptane, octane, wash benzine, petroleum ether, benzene, toluene and xylenes; ketones, such as acetone, methyl ethyl ketone and methyl isobutyl ketone; hydrogen sulfide and nitrobenzene, or mixtures of these solvents.

The term solvent does not mean that all the reaction components are soluble in the solvent. The reaction can also be carried out in a suspension or emulsion of one or several reactants. The reaction can also be carried out in a solvent mixture with a miscibility gap, in which at least one reactant is soluble in each of the mixed phases.

An aprotic solvent or solvent mixture is particularly preferred for variant (A) of process (1).

Process 2

If compounds of formula (I) in which R is a radical of formula (II), in which X represents a radical of the formula (VIII) are to be prepared, this preparation is preferably carried out by reacting compounds of the formula $$Z-CH_2CH_2CH_2SiQ_3 \qquad (XI)$$

in which Q represents the same or different radicals, in particular $C_1$- to $C_6$-alkoxy radicals or halogen atoms, preferably chlorine or bromine atoms, in the presence of a protic polar solvent and acids or bases as catalysts.

Preferred examples of the radicals Q in formula (XI) are methoxy and ethoxy radicals and chlorine atoms.

Acids are particularly preferred as the catalysts.

Examples of acids are Lewis acids, such as $BF_3$, $AlCl_3$, $TiCl_4$, $SnCl_4$, $SO_3$, $PCl_5$, $POCl_3$, $FeCl_3$ and hydrates thereof and $ZnCl_2$ and phosphorus nitride chlorides; Brönsted acids, such as hydrochloric acid, hydrobromic acid, sulfuric acid, chlorosulfonic acid, phosphoric acids, such as ortho-, meta- and polyphosphoric acids, boric acid, selenious acid, nitric acid, acetic acid, propionic acid, halogenoacetic acids, such as trichloro- and trifluoroacetic acid, oxalic acid, p-toluenesulfonic acid, acid ion exchangers, acid zeolites, acid-activated bleaching earths, acid-activated carbon black, hydrogen fluoride, hydrogen chloride and many other similar compounds.

Preferred solvents are the protic polar solvents listed above for process (1), in particular the alcohols mentioned there and water.

Process (2) is preferably carried out at temperature of from $-10°$ C. to $+40°$ C., in particular $0°$ C. to $25°$ C. The process can be carried out under the pressure of the surrounding atmosphere, that is to say, for example, 0.1 MPa (absolute), and it can also be carried out under higher or lower pressures. Pressures of from 0.08 to 0.2 MPa (absolute), in particular 0.09 to 0.15 MPa (absolute) are preferred.

Process 3

If compounds of formula (I) in which R represents a radical of formula (IV), with the proviso that up to $z-1$ of the R radicals in formula (I) can also be radicals of the formula $-O-SiR'_3$, are to be prepared, this preparation is preferably carried out by reacting silicates of formula (XII)

in which W represents different $C_1$- to $C_4$-alkyl radicals and z represents 6, 8 or 10, preferably the number 8, with compounds of the formulas (XIII)

$$LSi(R'_2)-Y \qquad (XIII)$$

and/or (XIV)

$$M[Si(R'_2)-Y]_2 \qquad (XIV),$$

and if appropriate, mixed with compounds of formulas (XVI)

$$LSi(R'_3) \qquad (XVI)$$

and/or (XVII)

$$M[Si(R'_3)]_2 \qquad (XVII)$$

in which, in the above formulas (XIII), (XIV), (XVI) and (XVII),

L represents a monovalent radical, that is, a hydroxyl group, a halogen atom or an amino group which is optionally substituted by up to two alkyl radicals having in each case up to 12 carbon atoms;

M represents a divalent radical, that is, an imino group which is optionally substituted by an alkyl radical having up to 12 carbon atoms, or a group of the formula $-O-$ or $-NH-CO-NH-$, and $R'$ and Y are the same as above.

In the above formulas, L preferably represents a hydroxyl group and M preferably represents a group of the formula $-O-$.

The preparation of silicates of formula (XII) is described by D. Hoebbel and W. Wieker [Zeitschrift for anorganische und allgemeine Chemie 384, pages 43–52 (1971), and I. Hasegawa and S. Sakka (Journal of Molecular Liquids 34, pages 307–315 (1987)]. The silicates of formula (XII) are prepared, for example, by hydrolysis of tetraethylsilicate in aqueous methanol in the presence of tetraalkylammonium hydroxides, in which the molecules of formula (XII), where z represents 6, 8 or 10 can be selectively prepared by a suitable choice of the tetraalkylammonium hydroxide and the weight ratios of the reactants.

Process (3) of this invention is preferably carried out in the presence of an acid catalyst.

Examples of such acid catalysts are the compounds mentioned as examples of acids for process (2), and in particular hydrochloric acid.

Process (3) is preferably carried out in a solvent, in particular in a protic polar solvent. Examples of such solvents are the examples of solvents mentioned as preferred for process (2).

Preferred solvents are the protic polar solvents mentioned above for process (1), and in particular the alcohols and water.

It is preferred that the silicates of formula (XII) be reacted with compounds of formula (XIV), if appropriate as a mixture with compounds of formula (XVII).

Especially preferred compounds of formula (XIV) are 1,3-divinyl−1,1,3,3-tetramethyldisiloxane, 1,1,3,3-tetramethyldisiloxane and 1,3-di(γ-chloropropyl)−1,1,3,3-tetramethyldisiloxane.

Hexamethyldisiloxane is especially preferred as the compound of formula (XVII).

Process (3) is preferably carried out at temperatures of from $-10°$ C. to $+70°$ C., and in particular from $0°$ C. to $40°$ C. The process can be carried out under the pressure of the surrounding atmosphere, that is to say, for example, 0.1 MPa (absolute), and it can also be carried out under higher or lower pressures. Pressures of from 0.08 to 0.2 MPa (absolute), in particular 0.09 to 0.15 MPa (absolute), are preferred.

Process 4

If compounds of formula (I) are to be prepared in which R represents a radical of formula (IV) and z represents the number 8 or 10, with the proviso that up to $z-1$ of the R radicals in formula (I) can also be a radical of the formula $-O-SiR'_3$, the preparation is preferably carried out by reacting silicates of formula (XVIII)

$$[(R'_3)SiOSiO_{3/2}]_w \qquad (XVIII)$$

in which $R'$ is the same as in formulas (V) and (VI) and w represents a number 8 or 10, with one or more compounds of the formulas (XIII) and/or (XIV) described above in "Process (3)".

Particularly preferred compounds of formula (XVIII) are those of formula (XIX):

$[(CH_3)_3SiOSiO_{3/2}]_w$ (XIX)

in which w is the same as in formula (XVIII) and preferably has a value of 8.

The preparation of the compounds of formula (XIX) is described in the article by D. Hoebbel and W. Wieker cited in the discussion of "Process (3)". It is carried out by silylating compounds of formula (XII) with hexamethyldisiloxane in an acid solution containing isopropanol.

It is preferred that compounds of formula (XVIII), and more preferably those of formula (XIX), be reacted with compounds of formula (XIV).

Especially preferred compounds of formula (XIV) are 1,3-divinyl-1,1,3,3-tetramethyldisiloxane, 1,1,3,3-tetramethyldisiloxane and 1,3-di(γ-chloropropyl)−1,1,3,3-tetramethyldisiloxane.

Process (4) is preferably carriedout in the presence of an acid catalyst.

Preferred acid catalysts are the Brönsted and Lewis acids cited as examples in "Process (2)", and in particular acid-activated bleaching earths, HCl and acid macroreticular resins, such as, for example, Amberlyst ® 15 (available from Janssen Chimica).

The reaction can be carried out without a solvent or preferably with a reactant as the solvent. If solvents are (additionally) to be used, the solvents (mixtures) mentioned in "Process (1B)" are preferred.

Process (4) is preferably carried out at temperatures of from −20° C. to 200° C., and in particular from 20° C. to 100° C. The process can be carried out under the pressure of the surrounding atmosphere, that is to say, for example, 0.1 MPa (absolute), and it can also be carried out under higher or lower pressures. Pressures of from 0.08 to 0.2 MPa (absolute), and in particular 0.09 to 0.15 MPa (absolute), are preferred.

When the reaction is complete, the catalyst, if one is used, is preferably removed. If the catalyst is solid and insoluble in the reaction mixture, it is preferably removed by decanting, filtering or centrifuging.

Solvents, if used, and/or unreacted starting substances are preferably removed from the reaction mixture, subsequently or at the same time by distillation.

The organohexasilsesquioxanes, organooctasilsesquioxanes and/or organodecasilsesquioxanes, in which the organo groups are olefinically unsaturated or contain hydrogen atoms bonded directly to silicon or sulfur atoms and/or alkoxy groups bonded directly to silicon atoms and which are according to this invention or can be prepared by the processes of this invention and also other compounds of this type can be used as crosslinking agents for polymers, especially for silicones.

All the reaction participants and auxiliary chemicals listed above can be employed individually or as a mixture. For example, mixtures of compounds of formula (IX), of compounds of formula (X), of compounds of formula (XI), of compounds of formula (XII), of compounds of formula (XIII) and of compounds of formula (XIV) can be employed, and mixtures of catalysts, of solvents and of organic peroxides or azo compounds can be employed.

In the following examples, (a) all the quantities are by weight; (b) all pressures are 0.10 MPa (absolute); and (c) all the temperatures are 20° C., unless otherwise specified.

EXAMPLE 1

Reaction of octavinyloctasilsesquioxane with pentamethyldisiloxane

About 2.00 g ($3.16 \times 10^{-3}$ mol) of octavinyloctasilsesquioxane (obtained in accordance With the procedure described by Voronkov), dissolved in 50 ml of toluene, were initially introduced into a 100 ml three-necked flask having a reflux condenser, thermometer and dropping funnel under a nitrogen atmosphere, and 0.03 ml of catalyst solution (solution of a platinum-olefin complex with a platinum content of 40 mg per 1 ml) was added.

The contents of the flask were heated to 80° C. and 7.50 g ($50.56 \times 10^{-3}$ mol) of pentamethyldisiloxane (obtained from Wacker-Chemie GmbH) were then slowly added dropwise. After further addition of 0.03 ml of the catalyst solution, the mixture was then stirred at 80° C. for 6 hours. After removal of toluene and excess pentamethyldisiloxane, 5.71 g of crude addition product, which could be further purified by recrystallization from ethanol, were obtained.

Yield: 2.39 g (42 percent of theory).

The resultant product is crystalline and has a melting point of 83° to 84° C.

According to $^1$H-NMR data, α-addition takes place to the extent of 9.2 mol percent. The gel permeation chromatogram shows the narrow half-value width characteristic of a uniform substance.

Vinyl-bonded silicon atoms are no longer detectable in the $^{29}$Si-NMR spectrum.

IR spectrum: asymmetric Si—O—Si stretching vibration of the siloxane cage structure at 1130 cm$^{-1}$.

EXAMPLE 2

Reaction of octavinyloctasilsesquioxane with dimethylmonoethoxysilane

In a procedure similar to that described in Example 1, 2.50 g ($3.95 \times 10^{-3}$ mol, of octavinyloctasilsesquioxane, dissolved in 32 ml of toluene, were initially introduced into the three-necked flask and 0.02 ml of catalyst solution (catalyst as in Example 1, but with a platinum content of 10 mg per ml) was added. The mixture was heated to 90° C. and 6.6 g ($63.46 \times 10^{-3}$ mol) of dimethylmonoethoxysilane were slowly metered in. After adding an additional 0.02 ml of the catalyst solution, the mixture was stirred at 80°-90° C. for 3 hours. After removal of toluene and unreacted silane, 5.4 g (93 percent of theory) of a highly viscous oil were obtained.

According to $^1$H-NMR data, α-addition took place to the extent of 9.5 mol percent. The gel permeation chromatogram and $^1$H- and $^{29}$Si-NMR and IR data confirmed the formation of the addition product.

EXAMPLE 3

Crosslinking of an α,w-H-polydimethylsiloxane with octavinyloctasilsesquioxane

Octavinyloctasilsesquioxane was mixed with an α,w-H-polydimethylpolysiloxane (average number of dimethylsiloxy units n=200) in a molar ratio of 1:4, with the addition of the weight of chloroform corresponding to the two components to give a homogeneous solution, and 36 percent by weight, based on the octavinyloctasilsesquioxane employed, of a catalyst solution (catalyst as in Example 1, but with a platinum content of 1 mg per ml) was added. The solution was applied to a glass carrier in a layer thickness which, after heating at 40° C.

under normal pressure for two hours, resulted in an approximately 2 mm thick film. The transparent film thus obtained is crosslinked and exhibits elastomeric properties. A comparison example under the conditions described, but without the addition of octavinyloctasilsesquioxane, showed no crosslinking.

The crosslinked film was then treated at 100° C. under normal pressure for 2 hours and at 100° C. in vacuo (100 Pa) for 12 hours to remove residual solvent.

In order to characterize the degree of crosslinking, the reciprocal equilibrium swelling value 1/Q was used in accordance with DIN 53 521, this being defined as follows:

$$1/Q = \frac{a}{b-a}$$

a = weight of the swollen test specimen after complete drying
b = weight of the swollen test specimen Tests specimens of the crosslinked film were swollen in toluene at 25° C. for 12 days. The non-crosslinked content was to be determined from the weight of the nonswollen test specimen and the weight of the swollen test specimen after complete drying. Mean value from 3 measurements: 1/Q = 0.355; soluble content: 3.7 percent.

EXAMPLE 4

Free radical addition of 1-dodecanethiol onto octavinyloctasilsesquioxane

About 2 g ($3.2 \times 10^{-3}$ mol) of octavinyloctasilsesquioxane were dissolved in 50 ml of toluene, 5.3 g ($26.2 \times 10^{-3}$ mol) of 1-dodecanethiol (available from Janssen Chimica) and 25 mg of $\alpha,\alpha'$-azobis-isobutyronitrile were added and the mixture was heated at 80° C. under a nitrogen atmosphere for 6 hours. After removal of the toluene under reduced pressure, 7.26 g of a solid residue remained.

$^1$H-NMR and $^{29}$Si-NMR data confirmed the addition of the SH group onto the vinyl group, the siloxane cage structure being preserved.

EXAMPLE 5

Addition of $\gamma$-mercaptopropylmethyldimethoxysilane onto octavinyloctasilsesquioxane About 2 g ($3.2 \times 10^{-3}$ mol) of octavinyloctasilsesquioxane were dissolved in 60 ml of toluene, 4.64 g ($25.7 \times 10^{-3}$ mol) of $\gamma$-mercaptopropylmethyldimethoxysilane (available as Wacker Silan GF 75 from Wacker-Chemie) were added and the mixture was irradiated with a mercury immersion lamp at 25° C. under a nitrogen atmosphere for 6 hours. Excess silane and toluene were then removed by distillation under reduced pressure.

A residue containing 6.38 g of a viscous oil remained.

$^1$H-NMR and $^{29}$Si-NMR data confirmed the addition of the SH group onto the vinyl group, the siloxane cage structure being preserved.

EXAMPLE 6

Synthesis of octa($\gamma$-chloropropyl)octasilsesquioxane

About 1 liter of methanol was initially introduced into a 2 liter flask with a dropping funnel and 45 g of $\gamma$-chloropropyltrichlorosilane (available as Wacker Silan GF 15 from Wacker-Chemie) were slowly added. After 28 ml of concentrated hydrochloric acid were added, the reaction mixture was stirred at room temperature.

After a period of time, a crystalline precipitate formed and, after 12 days, this was filtered off and washed with methanol. The yield was 7.15 g (26 percent of theory). The product has a melting point of 206° C. Chlorine content: (27.4 percent theory), found: 27.6 percent. The gel chromatogram indicated a monodisperse compound. IR and $^1$H- and $^{29}$Si-NMR data and the molecular weight determination by vapor pressure osmometry (found: 930 g/mol, theory: 1036 g/mol) confirmed the formation of octa($\gamma$-chloropropyl)octasilsesquioxane.

The oligosilsesquioxane was also prepared starting from $\gamma$-chloropropyltrimethoxysilane; after a reaction time of 3 months, a yield of 40 percent of theory was obtained.

EXAMPLE 7

Reaction of octa($\gamma$-chloropropyl)octasilsesquioxane with piperidine

About 70 g (0.822 mol) of piperidine were added to 7 g ($6.76 \times 10^{-3}$ mol) of octa($\gamma$-chloropropyl)octasilsesquioxane in a 100 ml flask equipped with a reflux condenser and internal thermometer and the mixture was heated at 105° C. under a nitrogen atmosphere for 16 hours, while stirring continuously. The solid obtained (piperidine hydrochloride and part of the desired product) was then filtered off and the filtrate was evaporated under reduced pressure (residue 4.12 g). The residue from the filtration was washed with water several times in order to remove the piperidine hydrochloride. A total of 9.02 g (94 percent of theory) of crude substitution product was obtained. This was recrystallized from heptane.

The $^1$H-NMR spectrum confirmed the complete nucleophilic substitution reaction on the $\gamma$-chloropropyl group.

EXAMPLE 8

Synthesis of octa(vinyldimethylsiloxy)octasilsesquioxane [(H$_2$C=CH)(CH$_3$)$_2$SiOSiO$_{3/2}$]$_8$ (a) About 1250 ml of 10 percent aqueous tetramethylammonium hydroxide solution were added to 82.2 g of precipitated silicic acid. After the mixture had been stirred at 25° C. for 16 hours and at 50° C. for 8 hours, a clear solution was obtained. The solution was concentrated to two-thirds of its original volume and the tetramethylammonium silicate contained therein was crystallized at 4° C. About 359.5 g of tetramethylammonium silicate which still contained water were obtained.

(b) About 160 g of this tetramethylammonium silicate were added in portions to a well-stirred mixture containing 450 ml of H$_2$0, 1000 ml of isopropanol, 1700 ml (1387 g) of 1,3-divinyl—1,1,3,3-tetramethyldisiloxane (available as Wacker Siloxan VSi2 from Wacker-Chemie GmbH) and 550 ml of concentrated hydrochloric acid and the reaction mixture was then stirred at room temperature for 7 days. The phases were then separated and the organic phase was washed with water until neutral, dried over sodium sulfate and evaporated completely. The residue was recrystallized from ethanol. About 64 g of a crystalline substance (69 percent of theory, based on the silicic acid employed), which, according to measurements by vapor pressure osmometry, had a molecular weight of 1120 g/mol$^{-1}$, were obtained. The gel permeation chromatography diagram indicates a uniform compound. The $^1$H—and $^{29}$Si-NMR and IR data agree with the structure for octa(vinyldimethylsiloxy)octasilsesquioxane.

EXAMPLE 9

Synthesis of octa(dimethylsiloxy)octasilsesquioxane [H(CH$_3$)$_2$SiOSiO$_{3/2}$]$_8$ About 160 g of the tetramethylammonium silicate prepared according to Example 8(a) were added in portions to a well-stirred mixture containing 400 ml of H$_2$O, 1000 ml of isopropanol, 1500 ml (1136 g) of 1,1,3,3-tetramethyldisiloxane (available as Wacker Siloxan HSi2 from Wacker-Chemie GmbH) and 200 ml of 10 percent hydrochloric acid and the reaction mixture was then stirred at room temperature for 4 hours.

The resultant product was recovered in accordance with the procedure described in Example 8(b). The resultant silylated product was recrystallized from acetone.

About 52.0 g of a crystalline substance (67 percent of theory, based on the silicic acid employed), which according to measurements by vapor pressure osmometry had a molecular weight of 1150 g.mol$^{-1}$, were obtained. The gel permeation chromatography diagram indicated a uniform compound. The $^1$H- and $^{29}$Si-NMR and IR data agree with the structure of octa(dimethylsiloxy)octasilsesquioxane. Active hydrogencontent: theory: 0.79 percent by weight, found: 0.75 percent by weight.

Surprisingly, under the above reaction conditions none of the hydrogen atoms bonded directly to Si atoms were removed.

EXAMPLE 10

Synthesis of octa($\gamma$-chloropropyldimethylsiloxy)octasilsesquioxane [ClCH$_2$CH$_2$CH$_2$(CH$_3$)$_2$SiOSiO$_{3/2}$]$_8$.

About 7.8 g of the tetramethylammonium silicate prepared according to Example 8(a) were added in portions to a well-stirred mixture containing 20 ml of H$_2$O, 60 ml of isopropanol, 100 ml (99 g) of 1,3-di-$\gamma$-chloropropyl)-1,1,3,3-tetramethyldisiloxane and 30 ml of concentrated hydrochloric acid and the reaction mixture was then stirred at room temperature for 48 hours.

The phases were then separated, the organic phase was washed several times with water until neutral and dried over sodium sulfate and excess disiloxane was then distilled off under reduced pressure. About 4.5 g of a viscous colorless liquid which, according to gel permeation chromatography and $^1$H—and $^{29}$Si-NMR data, contained a high content of the desired compound, were present as residue.

EXAMPLE 11

Reaction of octa(vinyldimethylsiloxy)octasilsesquioxane (prepared according to Example 8) with pentamethyldisiloxane About 2.8 g of pentamethyldisiloxane (18.9×10$^{-3}$ mol) were added to 1.5 g (1.2×10$^{-3}$ mol) of octa(vinyldimethylsiloxy)octasilsesquioxane in 15 ml of toluene under a nitrogen atmosphere. After addition of 2.25 ml of catalyst solution (norbornadiene-Pt complex in CH$_2$Cl$_2$ with a Pt content of 0.2 mg of platinum per ml of solution), the reaction mixture was heated at 35° C. for 4.5 hours. The toluene and excess pentamethyldisiloxane were then distilled off in vacuo.

Yield of viscous crude product: 2.94 g

Gel permeation chromatography and $^1$H-NMR data confirmed the hydrosilylation reaction. Evaluation of the $^1$H-NMR spectrum showed a content of $\alpha$-addition product of 10 mol percent.

EXAMPLE 12

Free radical addition of 1-dodecanethiol onto octa(vinyldimethylsiloxy)octasilsesquioxane.

About 5.4 g (26.7×10$^{-3}$ mol) of 1-dodecanethiol (available from Janssen Chimica) and 25 mg of $\alpha,\alpha'$-azobisisobutyronitrile were added to 4 g (3.3×10$^{-3}$ mol) of octa(vinyldimethylsiloxy)octasilsesquioxane (prepared according to Example 8) in 50 ml of toluene under a nitrogen atmosphere and the mixture was heated at 80° C. for 8.5 hours. The toluene was then distilled off under reduced pressure. An oily product remained as the residue. Gel permeation chromatography and $^1$H-NMR and $^{29}$Si-NMR data confirmed that 1-dodecanethiol had added onto the vinyl group, with the cage structure being preserved.

EXAMPLE 13

Free radical addition of $\gamma$-mercaptopropyldimethylmethoxysilane onto octa(vinyldimethylsiloxy)octasilsesquioxane About 2.35 g (14.3×10$^{-3}$ mol) of $\gamma$-mercaptopropyldimethylmethoxysilane were added to 2 g (1.6×10$^{-3}$ mol) of octa(vinyldimethylsiloxy)octasilsesquioxane (prepared according to Example 8) in 25 ml of toluene under a nitrogen atmosphere and the mixture was irradiated with a mercury immersion lamp at 25° C. for 5.5 hours.

The toluene and excess silane were then distilled off under reduced pressure.

About 4.2 g of a viscous oil remained as the residue. The analytical data ($^1$H-NMR and $^{29}$Si-NMR) confirmed the addition of the mercapto group onto the double bond.

EXAMPLE 14

Crosslinking of $\alpha,w$-H-polydimethylsiloxanes with octa(vinyldimethylsiloxy)octasilsesquioxane Octa(vinyldimethylsiloxy)octasilsesquioxane was mixed with in each case $\alpha,w$-H-polydimethylsiloxanes of various average chain lengths (average number of dimethylsiloxy units n: 8, 34, 95 or 200) in a molar ratio of 1:4 with addition of an amount of toluene sufficient to dissolve the octa(vinyldimethylsiloxy)octasilsesquioxane to form a homogeneous solution, and 49 ml per mol of octa(vinyldimethylsiloxy)octasilsesquioxane of a catalyst solution (solution of a Pt-olefin complex with a Pt content of 10 mg of Pt per ml of 1-octene) were added. The solution was applied to a glass carrier in a layer thickness which, after heating at 100° C. under normal pressure for one hour, resulted in an approximately 5 mm thick film. The crosslinked film was then treated at 100° C. in vacuo (100 Pa) for 15 hours to remove residual solvent.

Depending on the $\alpha,w$-H-polydimethylsiloxane used, the crosslinked films had brittle to elastomeric properties. For characterization of the degree of crosslinking, the crosslinked films were swollen in toluene at 25° C. for 12 days.

The data is summarized in the following table.

TABLE

| H-[Si(CH$_3$)$_2$O]$_n$Si(CH$_3$)$_2$H | Properties of the product. | Reciprocal equilibrium swelling value 1/Q in accordance with DIN 53 521 | Soluble content in % by weight |
| --- | --- | --- | --- |
| 8 | Transparent, very brittle, resinous | 1.288 | 2.3 |
| 34 | Transparent, still brittle, partly coherent film | 0.563 | 3.5 |
| 95 | Transparent coherent film with a certain elasticity | 0.263 | — |
| 200 | Transparent elastomeric film | 0.223 | 6.4 |

EXAMPLE 15

Synthesis of [(CH$_2$=CH)Si(CH$_3$)$_2$O]$_x$[(CH$_3$)$_3$SiO]$_{8-x}$(SiO$_{3/2}$)$_8$ About 30 g of the tetramethylammonium silicate prepared according to Example 8(a) were added in portions to a well-stirred mixture containing 72 ml of H$_2$O, 180 ml of isopropanol, 90 ml of concentrated hydrochloric acid, 134.2 ml (102 1 g=0.63 mol) of hexamethyldisiloxane and 143.6 ml 117.1 g=0.63 mol) of 1,3-divinyl-1,1,3,3-tetramethyldisiloxane and the reaction mixture was then stirred at room temperature for 24 hours. The phases were then separated, the organic phase was washed several times with water until neutral, dried over sodium sulfate and filtered. The filtrate was evaporated completely and the residue was dried at 80° C./100 Pa.

About 13.62 g of a crystalline substance, which according to the gas chromatogram was a mixture of substituted organosilyl silicates, were obtained.

EXAMPLE 16

Synthesis of [(CH$_2$=CH)Si(CH$_3$)$_2$O]$_x$[(CH$_3$)$_3$SiO]$_{8-x}$(SiO$_{3/2}$)$_8$ About 1 g (8.85×10$^{-4}$ mol, of octa(trimethylsiloxy)octasilsesquioxane, prepared in accordance with D. Hoebbel, W. Wieker, Zeitschrift for anorganische und allgemeine Chemie 384, 43 (1971)) were dissolved in 50 ml (40.5 g=0.217 mol) of 1,3-divinyl-1,1,3,3-tetramethyldisiloxane and 0.1 g of acid-activated bleaching earth (Tonsil Optimum FF, Süd-Chemie) was added and the mixture stirred at 60° C. for 20 hours. The catalyst was then filtered off and the solvent was removed by distillation. About 1.01 g of a crystalline substance which, according to the gas chromatogram, is a mixture of substituted organosilyl silicates of the above composition, remained as the residue.

EXAMPLE 17

Synthesis of deca(dimethylsiloxy)decasilsesquioxane [HSi(CH$_3$)$_2$OSiO$_{3/2}$]$_{10}$ (a) Synthesis of tetra-n-butylammonium silicate About 490 g (500 ml) of 40 percent aqueous tetra-n-butylammonium hydroxide solution (Fluka, D-7910 Neu-Ulm) were diluted with 700 ml of water, and 223.2 g (238.7 ml=1.07 mol of Si) of tetraethoxysilane were slowly added. The mixture was then stirred at room temperature for 24 hours. Thereafter, it was concentrated by distillation to 64.9 percent of the original total amount and the solution was crystallized at 4° C.

(b) Silylation

About 50 g of the tetra-n-butylammonium silicate prepared according to (a) above were slowly added to a mixture containing 250 ml (189.3 g) of 1,1,3,3-tetramethyldisiloxane (available as Wacker Siloxan HSi2 from Wacker-Chemie), 130 ml (112.2 g) of dimethylchlorosilane and 50 ml of isopropanol at 5° C. The mixture was then stirred at room temperature for 6.5 hours. About 300 ml of ice-water were subsequently added, the organic phase was washed until neutral, dried over sodium sulfate and filtered and the solvent was removed at 60° C./1500 Pa. About 8.5 g of a viscous crystal mass remained. Crystallization from 1,1,3,3-tetramethyldisiloxane gave 1.86 g of deca(dimethylsiloxy)decasilsesquioxane (25 Percent theory).

The analytical data agreed with the structure for deca(dimethylsiloxy)decasilsesquioxane.

EXAMPLE 18

Synthesis of deca(vinyldimethylsiloxy)decasilsesquioxane [(H$_3$C$_2$)(CH$_3$)$_2$SiOSiO$_{3/2}$]$_{10}$ Example (17) was repeated, except an equivalent amount of 1,3-divinyl-1,1,3,3-tetramethyldisiloxane and vinyldimethylchlorosilane was substituted for 1,1,3,3-tetramethyldisiloxane and dimethylchlorosilane in step (b) above. A product identified as deca(vinyldimethylsiloxy)decasilsesquioxane was obtained.

EXAMPLE 19

Synthesis of hexa(dimethylsiloxy)hexasilsesquioxane [HSi(CH$_3$)$_2$O SiO$_{3/2}$]$_6$ (a) Synthesis of tetraethylammonium silicate About 412 g (400 ml) of 40 percent aqueous tetraethylammonium hydroxide solution (Fluka, D-710 Neu-Ulm) were diluted with 200 ml of water, and then 225 g (240.6 ml= 1.08 mol of Si) of tetraethoxysilane were slowly added. The mixture was then stirred at room temperature for 24 hours. It was then concentrated by distillation to 45.2 percent of the original weight and the solution was crystallized at 4° C.

(b) Silylation

About 22 g of the tetraethylammonium silicate prepared in (a) above were added to a mixture, cooled to 5° C., containing 80 ml (60.6 g) of 1,1,3,3-tetramethyldisiloxane (Wacker-Chemie GmbH), 80 ml (69.1 g) of dimethylchlorosilane (Wacker-Silan HM2 from Wacker-Chemie GmbH) and 160 ml of dimethylformamide at 5° C. over a period of 20 minutes. During this addition, the temperature rose form 5° C. to 15° C. The mixture was then stirred at 5° C. for 1 hour. About 200 ml of ice water were subsequently added, the organic phase was washed with water until neutral, dried over sodium sulfate, filtered and the solvent was distilled off at 60° C./1500 Pa. A clear, viscous liquid remained, from which crystals separated out on cooling and were then filtered off.

The analytical data agreed with the structure of hexa(dimethylsiloxy)hexasilsesquioxane.

What is claimed is:

1. A compound of the formula $$[RSiO_{3/2}]_z \quad (I)$$

in which z is 6, 8 or 10; and R is a radical selected from the group consisting of the formulas —CH$_2$CH$_2$—X (II), —CH(CH$_3$)—X (III) and —O—Si(R'$_2$)—Y (IV), with the proviso that up to z−1 of the R radicals can also be radicals of the formula —O—SiR'$_3$, in which X is a radical selected from the group consisting of a monovalent radical and one-half of a divalent radical selected from the group consisting of the formulas $$—(R'_2SiO)_nR', \quad (V)$$

$$[—(R'_2SiO)_n—]_{\frac{1}{2}}, \quad (VI)$$

$$—S—R'', \quad (VII)$$

$$[—S—R'''—S—]_{\frac{1}{2}} \text{ and} \quad (XV)$$

$$—CH_2—Z; \quad (VIII)$$

R' is selected from the group consisting of C$_1$- to C$_6$-alkyl, C$_1$- to C$_6$-alkoxy and phenyl radicals;

R'' is selected from the group consisting of C$_1$- to C$_{18}$-alkyl radicals, and C$_1$-to C$_{18}$-alkyl radicals which are substituted by radicals selected from the group consisting of the formulas (V) and (VI);

R''' is selected from the group consisting of divalent C$_1$- to C$_{18}$-hydrocarbon radicals, radicals of the formula —(R'$_2$SiO)$_n$—; and mixtures thereof;

Z is selected from the group consisting of a halogen atom, —NH$_2$ radical, N-piperidinyl, N-piperazinyl, N-morpholinyl radical, a C$_1$- to C$_6$—N-monoalkylamino and a C$_1$- to C$_6$dialkylamino radical;

Y is selected from the group consisting of a hydrogen atom, a C$_2$- to C$_{10}$-hydrocarbon radical, a halogenated C$_2$- to C$_{10}$-hydrocarbon radical and a radical selected from the group consisting of formula (II) and (III); and n is an integer having a value of at least 1.

2. The compound of claim 1, in which R' is selected from the group consisting of methyl, methoxy and ethoxy groups;

R'' is selected from the group consisting of C$_1$- to C$_{14}$-alkyl radicals and C$_1$- to C$_{14}$-alkyl radicals which are substituted by a radical selected from the group consisting of formulas (V) and (VI); Z is selected from the group consisting of hydrogen atom, a bromine atom and an N-piperidinyl radical; and Y is selected from the group consisting of a hydrogen atom, a vinyl, allyl, 3-chloropropyl or 3-bromopropyl group, and a radical of formula (II) or (III)

3. A process for preparing the compound of claim 1, having the formula $$[RSiO_{3/2/1}]_z \quad (I),$$

ps where is selected from the group consisting of the formulas —CH$_2$CH$_2$—X (II), —CH(CH$_3$)—X (III) and OSi(R'$_2$)—Y (IV);

X is a radical selected from the gruop consisting of the formulas —(R'$_2$SiO)$_n$R' (V), [—(R'$_2$SiO)$_n$—]$_{\frac{1}{2}}$ (VI), —S—R'' (VII) and (—S—R'''—S)$_{\frac{1}{2}}$ (XV);

Y is selected from the group consisting of the formulas —CH$_2$CH$_2$—X (II) and —CH(CH$_3$)—X (III), which comprises reacting a compound of the formula $$[E—(R'_2SiO)_ySiO_{3/2}]_x[RSiO_{3/2}]_{8-x} \quad (IX)$$

with a compound of the formula $$GX \quad (X)$$

in which E is selected from the group consisting of hydrogen atoms and vinyl groups, which are bonded to silicon atoms and sulfur atoms, G is selected from the group consisting of hydrogen atoms and vinyl groups, which are bonded to silicon atoms and sulfur atoms, with the proviso that the radical E of formula (IX) is different from the radical G in formula (X), R' is selected from the group consisting of C$_1$- to C$_6$-alkyl radicals, C$_1$- to C$_6$-alkoxy radicals and phenyl radicals; R'' is selected from the group consisting of C$_1$- to C$_{18}$-alkyl radicals and C$_1$- to C$_{18}$-alkyl radicals which are substituted by radicals selected from the group consisting of the formulas (V) and (VI); R''' is selected from the group consisting of divalent C$_1$- to C$_{18}$-hydrocarbon radicals, radicals of the formula —(R'$_2$SiO)$_n$— and mixtures thereof; n is an integer having a value of at least 1; x is an integer having a value of from 1 to 8; y is an integer having a value of at least 0, and z is 6, 8 or 10.

4. The process of claim 3, wherein the reaction is conducted in the presence of a platinum metal or compound thereof, wherein R is a radical of the formula $$—CH_2—CH_2—X, \quad (II)$$

X is a radical of the formula
[—R'$_2$SiO)$_n$R' ]

$$—(R'_2SiO)_nR' \quad (V)$$

R' is selected from the group consisting of C$_1$- to C$_6$-alkyl, C$_1$- to C$_6$-alkoxy and phenyl radicals and n is an integer having a value of at least 1.

5. The process of claim 3, wherein the reaction is conducted in the presence of a platinum metal or compound thereof, where R is a radical of the formula $$—CH(CH_3)—X, \quad (III)$$

X is a radical of the formula
[—R'$_2$SiO)$_n$R' ], $$—(R'_2SiO)_nR' \quad (V)$$

R' is selected from the group consisting of C$_1$- to C$_6$-alkyl, C$_1$- to C$_6$-alkoxy and phenyl radicals and n is an integer having a value of at least 1.

6. The process of claim 3, wherein the reaction is conducted in the presence of free radicals, where X is a radical of the formula $$—S—R'' \quad (VII)$$

and R″ is selected from the group consisting of C$_1$- to C$_{18}$-alkyl radicals and C$_1$- to C$_{18}$-alkyl radicals which are substituted by radicals selected from the group consisting of formulas (V) and (VI).

7. The process of claim 3, wherein the reaction is conducted in the presence of free radicals, where X is a radical of the formula $$(S-R'''-S)_{\frac{1}{2}} \qquad (XV)$$

and R‴ is selected from the group consisting of divalent C$_1$- to C$_{18}$-hydrocarbon radicals, radicals of the formula —(R′$_2$SiO)$_n$ and mixtures thereof in which R′ is selected from the group consisting of C$_1$-to C$_6$-alkyl radicals, C$_1$- to C$_6$-alkoxy radicals and phenyl radicals 8. A process for preparing the compound of claim 1, which comprises reacting a compound of the formula $$Z-CH_2CH_2CH_2SiQ_3 \qquad (XI)$$

in the presence of a protic polar solvent and a catalyst selected from the group consisting of anacid and a base, where R is a radical of the formula $$-CH_2CH_2-X \qquad (II)$$

X is a radical of the formula $$-CH_2-Z \qquad (VIII)$$

Q is selected from the group consisting of C$_1$- to C$_6$-alkoxy radicals and halogen atoms; Z is selected from the group consisting of an NH$_2$ radical, N-piperidinyl, N-piperazinyl radical, N-morpholinyl radical, a C$_1$- to C$_6$-N-monoalkylamino radical and a C$_1$- to C$_6$-dialkylamino radical and z is 6, 8 or 10.

9. A process for preparing the compound of claim 1, which comprises reacting a silicate of the formula $$[W_4NOSiO_{3/2}]_z \qquad (XII)$$

with a compound selected from the group consisting of the formulas $$LSi(R'_2)Y, \qquad (XIII)$$

$$M[SiR'_2-Y]_2, \qquad (XIV)$$

and mixtures thereof in which R represents a radical of the formula $$-O-Si(R'_2)-Y, \qquad (IV)$$

with the proviso that up to z−1 of the R radicals in formula I can be radicals of the formula $$-O-SiR_3,$$

L is selected from the group consisting of a hydroxyl group, a halogen atom and an amino group which may be substituted with up to two alkyl radicals each having up to 12 carbon atoms,
M is selected from the group consisting of an imino group which may be substituted with an alkyl radical having up to 12 carbon atoms, a group of the formula —O—, and an —NH—CO—NH— group,
R′ is selected from the group consisting of C$_1$- to C$_6$-alkyl, C$_1$- to C$_6$-alkoxy and phenyl radicals,
Y is selected from the group consisting of a hydrogen atom, a C$_1$- to C$_{10}$-hydrocarbon radical, a halogenated C$_1$- to C$_{10}$-hydrocarbon radical and a radical selected from the group consisting of —CH$_2$CH$_2$—X (II) and —CH(CH$_3$)—X (III),
X is selected from the group consisting of a monovalent hydrocarbon radical and one-half of a divalent radical selected form the group consisting of the formulas $$-(R'_2SiO)_nR', \qquad (V)$$

$$[-(R'_2SiO)_n-]_{\frac{1}{2}}, \qquad (VI)$$

$$-S-R'', \qquad (VII)$$

$$[-S-R'''-S-]_{\frac{1}{2}}, \qquad (XV)$$

and $$-CH_2Z \qquad (VIII)$$

R′ is the same as above,
R″ is selected from the group consisting of C$_1$- to C$_{18}$-alkyl radicals, and C$_1$- to C$_{18}$-alkyl radicals which are substituted by radicals selected from the group consisting of the formulas (V) and (VI);
R‴ is selected from the group consisting of divalent C$_1$- to C$_{18}$-hydrocarbon radicals, radicals of the formula —(R′$_2$SiO)$_n$—; and mixtures thereof;
W is C$_1$- to C$_4$-alkyl radicals;
Z is selected from the group consisting of a halogen atom, —NH$_2$ radical, an N-piperidinyl, N-piperazinyl, N-morpholinyl radical, a C$_1$- to C$_6$-N-monoalkylamino and a C$_1$- to C$_6$-dialkylamino radical;
n is an integer having a value of at least 1;
z is 6, 8 or 10.

10. The process of claim 9, wherein the silicate of the formula $$[W_4NOSiO_{3/2}]_z \qquad (XII)$$

is reacted with a compound selected from the group consisting of formulas $$LSi(R'_2)Y, \qquad (XIII)$$

$$M[SiR'_2-Y]_2 \qquad (XIV)$$

and mixtures thereof and a compound selected from the group consisting of the formulas $$LSi(R'_3) \qquad (XVI)$$

$$M[Si(R'_3)]_2 \qquad (XVII)$$

and mixtures thereof, in which
L is selected from the group consisting of a hydroxyl group, a halogen atom and an amino group which may be substituted with up to two alkyl radicals each having up to 12 carbon atoms;
M is selected from the group consisting of an imino group which may be substituted with an alkyl radical having up to 12 carbon atoms, a group of the formula —O— and an —NH—CO—NH— group;
R′ is selected from the group consisting of C$_1$- to C$_6$-alkyl, C$_1$- to C$_6$-alkoxy and phenyl radicals;
Y is selected from the group consisting of a hydrogen atom, a C$_1$- to C$_{10}$-hydrocarbon radical, a halogenated $C_1$- to $C_{10}$-hydrocarbon radical and a radical selected from the group consisting of —$C_2CH_2$—X (II) and —$CH(CH_3)$—X (III);

X is selected from the group consisting of a monovalent hydrocarbon radical and one-half of a divalent hydrocarbon radical selected from the group consisting of the formulas $$—(R'_2SiO)_nR', \qquad (V)$$

$$[—(R'_2SiO)_n—]_{\frac{1}{2}}, \qquad (VI)$$

$$—S—R'', \qquad (VII)$$

$$[—S—R'''—S—]_{\frac{1}{2}}, \qquad (XV)$$

$$—CH_2X \qquad (VIII)$$

R' is the same as above,

R'' is selected from the group consisting of $C_1$- to $C_{18}$-alkyl radicals, and $C_1$- to $C_{18}$-alkyl radicals which are substituted by radicals selected from the group consisting of the formulas (V) and (VI);

R''' is selected from the group consisting of divalent $C_1$- to $C_{18}$-hydrocarbon radicals, radicals of the formula —$(R'_2SiO)_n$—; and mixtures thereof;

W is $C_1$- to $C_4$-alkyl radicals;

Z is selected from the group consisting of a halogen atom, —$NH_2$ radical, an N-piperidinyl, N-piperazinyl, N-morpholinyl radical, a $C_1$- to $C_6$-N-monoalkylamino and a $C_1$- to $C_6$-dialkylamino radical;

n is an integer having a value of at least 1;

z is 6, 8 or 10.

11. A process for preparing the compound of claim 1, which comprises reacting a silicate of the formula $$[(R'_3)SiOSiO_{3/2}]_w \qquad (XVIII)$$

with a compound selected from the group consisting of the formulas $$LSI(R'_2)Y, \qquad (XIII)$$

$$M[SiR'_2—Y]_2 \qquad (XIV)$$

in which R is a radical of the formula $$—O—Si(R'_2)—Y \qquad (IV)$$

with the proviso that z—1 of the R radicals in formula I can be radicals of the formula —O—SiR'$_3$;

L is selected from the group consisting of a hydroxyl group, a halogen atom and an amino group which may be substituted with up to two alkyl radicals each having up to 12 carbon atoms;

M is selected from the group consisting of an imino group which may be substituted with an alkyl radical having up to 12 carbon atoms, a group of the formula —O— and an —NH—CO—NH— group;

R' is selected from the group consisting of $C_1$- to $C_6$-alkyl, $C_1$- to $C_6$-alkoxy and phenyl radicals;

Y is selected from the group consisting of a hydrogen atom, a $C_1$- to $C_{10}$-hydrocarbon radical, a halogenated $C_1$- to $C_{10}$-hydrocarbon radical and a radical selected from the group consisting of —$CH_2CH_2$—X (II) and —$CH(CH_3)$—X (III);

X is selected from the group consisting of a monovalent hydrocarbon radical and one-half of a divalent radical selected from the group consisting of the formulas $$—(R'_2SiO)_nR', \qquad (V)$$

$$[—(R'_2SiO)_n—]_{\frac{1}{2}}, \qquad (VI)$$

$$—S—R'', \qquad (VII)$$

$$[—S—R'''—S—]_{\frac{1}{2}}, \qquad (XV)$$

and $$—CH_2Z \qquad (VIII)$$

R' is the same as above,

R'' is selected from the group consisting of $C_1$- to $C_{18}$-alkyl radicals, and $C_1$- to $C_{18}$-alkyl radicals which are substituted by radicals selected from groups consisting of the formulas (V) and (VI); R''' is selected from the group consisting of divalent $C_1$- to $C_{18}$-hydrocarbon radicals, radicals of the formula —$(R'_2SiO)_n$—; and mixtures thereof;

W is $C_1$- to $C_4$-alkyl radicals;

Z is selected from the group consisting of a halogen atom, —$NH_2$ radical, an N-piperidinyl, N-piperazinyl, N-morpholinyl radical, a $C_1$- to $C_6$-N-monoalkylamino and a $C_1$- to $C_6$-dialkylamino radical;

n is an integer having a value of at least 1;

w is 8 or 10; and z is 8 or 10.

12. A process for crosslinking crosslinkable polymers which comprises mixing the polymers with a cross-linking agent selected from the group consisting of organohexasilsesquioxane, organooctasilsesquioxane, organodecasilsesquioxane and mixtures thereof, in which the organo groups are selected from the group consisting of olefinically unsaturated groups, an organo group having hydrogen atoms bonded directly to silicon, an organo group having sulfur atoms, an organo group having an alkoxy group bonded directly to silicon and mixtures thereof.

* * * * *